(12) United States Patent
Ederer et al.

(10) Patent No.: US 7,181,842 B2
(45) Date of Patent: Feb. 27, 2007

(54) METHOD OF PRODUCING A WORKPIECE FORMING AT LEAST ONE BEARING EYE

(75) Inventors: Ulf G. Ederer, Mondsee-Tiefgraben (AT); Thomas Rumpf, Gmunden (AT); Elisabeth Schneiderbauer, Taufkirchen (AT)

(73) Assignee: Miba Gleitlager GmbH, Laakirchen (AT)

( * ) Notice: Subject to any disclaimer, the term of this patent is extended or adjusted under 35 U.S.C. 154(b) by 561 days.

(21) Appl. No.: 10/678,668

(22) Filed: Oct. 3, 2003

(65) Prior Publication Data
US 2004/0064950 A1 Apr. 8, 2004

(30) Foreign Application Priority Data
Oct. 4, 2002 (AT) .............................. A 1503/2002

(51) Int. Cl.
*B21D 53/84* (2006.01)
(52) U.S. Cl. ............................... 29/888.09; 29/898.12; 29/527.4; 29/527.2
(58) Field of Classification Search ............ 29/888.09, 29/898.12, 898.042, 898.047, 527.2, 527.4; 205/131, 151; 74/579 R
See application file for complete search history.

(56) References Cited

U.S. PATENT DOCUMENTS

| | | | | |
|---|---|---|---|---|
| 6,688,273 B2 * | 2/2004 | Ederer | ...................... | 123/197.3 |
| 2002/0104506 A1 * | 8/2002 | Ederer | ...................... | 123/197.3 |

FOREIGN PATENT DOCUMENTS

| | | |
|---|---|---|
| DE | 3715323 A1 | 1/1988 |
| DE | 19617402 A1 | 6/1997 |
| DE | 086322 A1 | 9/1998 |
| DE | 10035032 A1 | 2/2002 |
| EP | 0635104 B1 | 1/1995 |

* cited by examiner

*Primary Examiner*—Marc Jimenez
(74) *Attorney, Agent, or Firm*—Collard & Roe, P.C.

(57) ABSTRACT

A method of producing a workpiece forming at least one bearing eye is described, which is divided in the region of the bearing eye along an intended fracture point through a fracture separation, the bearing eye being coated with an anti-friction coating after assembly of the parts. In order to achieve a high load capacity, it is suggested that the bearing eye be processed for a precise fit after assembly of the parts obtained through the fracture separation of the workpiece, before the anti-friction coating is applied to the processed bearing eye surface in a thickness corresponding to the final dimensions.

6 Claims, No Drawings

METHOD OF PRODUCING A WORKPIECE FORMING AT LEAST ONE BEARING EYE

FIELD OF THE INVENTION

The present invention relates to a method of producing a workpiece forming at least one bearing eye, which is divided in the region of the bearing eye along an intended fracture point through a fracture separation, the bearing eye being coated with an anti-friction coating after assembly of the parts.

DESCRIPTION OF THE PRIOR ART

Friction bearings subjected to high dynamic loads, for connecting rods of internal combustion engines, for example, are generally made of bearing shells which are received by a divided bearing seat of the workpiece. In order to avoid the disadvantages in regard to the overall size and therefore the weight, as well as the production cost, connected with providing separate bearing shells, it has already been suggested that the bearing eye provided in the workpiece be coated directly with an anti-friction material (European Patent Application 0 635 104 B1). For this purpose, the workpiece may be coated with the anti-friction coating through a thermal spray method, before the anti-friction coating applied to the bearing eye surface is divided together with the workpiece or, if the workpiece is already divided, is itself divided corresponding to the workpiece by a fracture separation. As an additional advantage of this direct coating of the bearing eye, it was emphasized that the bearing eye surface to be coated must no longer be reprocessed for a precise fit, because imprecisions are compensated for by applying the anti-friction coating and it is therefore no longer necessary to appropriately process the anti-friction coating itself precisely. However, the compensation of imprecisions of the bearing eye requires sufficiently thick anti-friction coatings, which thermal spray methods are particularly suitable for applying. However, such thermal spray methods have the disadvantage that the adhesion between the anti-friction coating sprayed on and the bearing eye surface is hardly sufficient for high load requirements without something further. In addition, due to the compensation of imprecisions, after the anti-friction coating has been processed for a precise fit, a non-uniform thickness of the anti-friction coating, whose distribution is unpredictable, must be expected, which, due to the fatigue strength, which is reduced with the thickness of the anti-friction coating, may lead to a localized overload of the anti-friction coating, for example, if anti-friction coating zones, whose position may not be influenced, occur in a high load bearing region.

SUMMARY OF THE INVENTION

The present invention is therefore based on the object of implementing a method of producing a workpiece having at least one bearing eye of the type initially described in such a way that, with a comparatively low production cost, a high dynamic bearing load capacity may be ensured without impairing the service life.

This object is achieved according to the present invention in that the bearing eye is processed for a precise fit after assembly of the parts obtained through the fracture separation of the workpiece, before the anti-friction coating is applied to the processed bearing eye surface in a thickness corresponding to the final dimensions.

Since, as a consequence of these measures, the workpiece is first divided by a fracture separation before the reassembled parts are processed for a precise fit in the region of the bearing eye, the deformation of the bearing eye connected with the fracture separation due to brittleness of the workpiece occurring in the region of the intended fracture point, for example, has no influence on the precision of the processed bearing eye, so that with a thin-layered application of the anti-friction coating, the final dimensions of the bearing may be ensured without reprocessing, and with the advantage that the anti-friction coating has a constructively predetermined thickness gradient, which represents an essential requirement for a high service life of friction bearings subjected to high dynamic loads, particularly since comparatively thin anti-friction coatings having a thickness of, for example, 20 to 40 μm are possible within narrow tolerance ranges, if no compensation of imprecisions via the anti-friction coating thickness is required.

Such anti-friction coatings may be applied physically in vacuum with the necessary precision due to the restricted coating thickness. The coating outlay may be simplified in relation to this application method by a galvanic deposition of the anti-friction coating on the bearing eye surface, however, with equally good bonding between the anti-friction coating and the bearing eye surface. The fracture separation of the anti-friction coating when detaching the assembled parts of the workpiece does not represent a difficulty due to the low coating thickness and the good adhesion to the bearing eye surfaces of both the galvanically deposited anti-friction coating and the anti-friction coating applied physically in vacuum. The assignment of the parts of the workpiece predetermined by the fracture separation of the workpiece ensures a precise mutual alignment of the parts when the workpiece is assembled, so that the running surface formed by the anti-friction coating does not form any interference points in regard to implementing a lubricant film in the region of the fracture separation. Through the measures according to the present invention, the advantages in regard to the workpiece dimensions and the construction outlay of bearing eyes coated directly with an anti-friction coating may therefore be exploited without having to fear impairment of the load capacity and the fatigue strength.

In some circumstances, there is the danger that, during the galvanic deposition of the anti-friction coating, liquid from the electrolyte bath will penetrate into the fracture gap between the parts of the workpiece divided by a fracture separation due to a capillary effect, which may be the start of later corrosion of the workpiece and may also cause interference with the depositing procedure, due to local precipitation of materials which could impair the adhesion of the deposited coating, for example. To avoid these consequences, the fracture gap between the parts of the workpiece may be sealed in relation to the galvanic bath before the galvanic deposition of the anti-friction coating, in that the fracture gap is filled with water, for example, which is sucked into the fracture gap due to the capillary effect and prevents the penetration of bath liquid into the fracture gap. The very small fracture gap does not allow rapid diffusion and/or rapid mass transfer. If necessary, additives in the form of thickeners may be added to the water to slow the diffusion speed.

Another possibility for sealing the fracture gap results if a wax is used as the sealing agent. A solvent having low viscosity and low surface tension, such as petroleum ether, may be used to liquefy the wax. The wax may also be liquefied at high temperatures, however.

Finally, the fracture gap may be sealed with the aid of a stretchable film made of plastic, such as polypropylene, which is inserted between the parts of the workpiece. While the insertion of the sealing film or the closing of the pores with wax, which is liquefied at high temperatures, requires the parts of the workpiece to be opened, the sealing of the fracture gap with a liquid of appropriately low viscosity may be performed while the parts of the workpiece are assembled, due to the capillary effect.

It probably does not have to be especially emphasized that the present invention is not restricted to a specific anti-friction coating, but in principle allows the use of all anti-friction coating materials which may be deposited with a sufficient precision in a predetermined, restricted coating thickness in order to ensure the final dimensions of the coated bearing eye without reprocessing, and which ensure appropriate bonding to the bearing eye surface. Therefore, anti-friction coatings based on plastic may also be used, which generally, however, requires physical application of the anti-friction coating in vacuum. In certain circumstances, appropriate bonding agents may be used to improve the adhesion.

What is claimed is:

1. A method of producing a workpiece forming at least one bearing eye, which is divided in the region of the bearing eye along an intended fracture point by a fracture separation, the bearing eye being coated with an anti-friction coating after assembly of the parts of the workpieces obtained through the fracture separation, characterized in that the bearing eye is processed for a precise fit after assembly of the parts obtained through the fracture separation of the workpiece, but before the anti-friction coating is applied to the processed bearing eye surface in a thickness corresponding to the final dimensions, the anti-friction coating is galvanically deposited in a galvanic bath onto the bearing eye surface in a thickness corresponding to the final dimensions, and before the galvanic deposition of the anti-friction coating, the fracture gap between the parts of the workpiece is sealed in relation to the galvanic bath.

2. The method according to claim 1, characterized in that the fracture gap is filled with water, to which additives are added if necessary to slow the diffusion speed.

3. The method according to claim 1, characterized in that the fracture gap is sealed using a wax.

4. The method according to claim 3, characterized in that the wax is dissolved in a solvent having low viscosity and low surface tension.

5. The method according to claim 4, characterized in that the wax is heated to seal the fracture gap.

6. The method according to claim 1, characterized in that a stretchable film made of plastic is inserted between the parts of the workpiece to seal the fracture gap.

* * * * *